US012339891B2

United States Patent
Bao et al.

(10) Patent No.: US 12,339,891 B2
(45) Date of Patent: Jun. 24, 2025

(54) METHOD AND SYSTEM FOR EXTRACTING METADATA FROM UNSTRUCTURED DATA

(71) Applicant: Dell Products L.P., Round Rock, TX (US)

(72) Inventors: Qi Bao, Acton, MA (US); Flavio Paiva Junqueira, Barcelona (ES)

(73) Assignee: DELL PRODUCTS L.P., Round Rock, TX (US)

( * ) Notice: Subject to any disclaimer, the term of this patent is extended or adjusted under 35 U.S.C. 154(b) by 21 days.

(21) Appl. No.: 18/193,748

(22) Filed: Mar. 31, 2023

(65) Prior Publication Data

US 2024/0330350 A1 Oct. 3, 2024

(51) Int. Cl.
*G06F 16/31* (2019.01)
*G06F 16/3331* (2025.01)
*G06F 16/38* (2019.01)

(52) U.S. Cl.
CPC .............. *G06F 16/38* (2019.01); *G06F 16/31* (2019.01); *G06F 16/3331* (2019.01)

(58) Field of Classification Search
CPC ...... G06F 16/38; G06F 16/383; G06F 16/387; G06F 16/31; G06F 16/3331; G06F 16/906; G06F 16/14; G06F 16/213
See application file for complete search history.

(56) References Cited

U.S. PATENT DOCUMENTS

| 10,878,018 | B1 * | 12/2020 | Aloisio et al. | G06F 16/35 707/737 |
| 2011/0029580 | A1 * | 2/2011 | Popovski et al. | G06F 12/00 707/812 |
| 2020/0104181 | A1 * | 4/2020 | Pyati et al. | G06F 9/5038 |

OTHER PUBLICATIONS

Zhou et al. "Metadata Extraction and Organization for Intelligent Video Surveillance System" Proceedings of the 2010 IEEE International Conference on Mechatronics and Automation Aug. 4-7, 2010, Xi'an, China (Year: 2010).*

* cited by examiner

*Primary Examiner* — Ajay M Bhatia
*Assistant Examiner* — Berhanu Mitiku
(74) *Attorney, Agent, or Firm* — Chamberlain, Hrdlicka, White, Williams & Aughtry; Aly Z. Dossa (57) ABSTRACT

Techniques described herein relate to a method for managing metadata for unstructured data. The method includes identifying a first storage event associated with a first unstructured data object; streaming, from a storage resource, first system metadata associated with the first unstructured data object; identifying, using a first system metadata processor, a first object type associated with the first unstructured data object based on the first system metadata; storing the first system metadata in a first entry of a first metadata table; streaming second system metadata associated with a second unstructured data object; identifying, using the first system metadata processor, a second object type associated with the second unstructured data object based on the second system metadata; and storing the second system metadata in a second entry of a second metadata table, wherein the second metadata is queried to obtain the first unstructured data object.

17 Claims, 6 Drawing Sheets

METHOD AND SYSTEM FOR EXTRACTING METADATA FROM UNSTRUCTURED DATA

BACKGROUND

Computing devices may provide services for users. To provide the services, the computing devices may generate data. The computing devices may provide and obtain data from other computing devices. The data may be used to computer implemented services. The data may include metadata.

SUMMARY

In general, certain embodiments described herein relate to a method for managing metadata for unstructured data. The method may include identifying a first storage event associated with a first unstructured data object; in response to identifying the first storage event: streaming, from a storage resource, first system metadata associated with the first unstructured data object; identifying, using a first system metadata processor, a first object type associated with the first unstructured data object based on the first system metadata; storing the first system metadata in a first entry of a first metadata table; streaming second system metadata associated with a second unstructured data object; identifying, using the first system metadata processor, a second object type associated with the second unstructured data object based on the second system metadata; and storing the second system metadata in a second entry of a second metadata table, wherein the second metadata is queried to obtain the first unstructured data object.

In general, certain embodiments described herein relate to a system for performing data protection of file system data on a host. The system includes a storage resources for storing unstructured data objects. The system also includes a metadata manager that includes a processor and memory and is programmed to identify a first storage event associated with a first unstructured data object; in response to identifying the first storage event: stream, from a storage resource, first system metadata associated with the first unstructured data object; identify, using a first system metadata processor, a first object type associated with the first unstructured data object based on the first system metadata; store the first system metadata in a first entry of a first metadata table; stream second system metadata associated with a second unstructured data object; identify, using the first system metadata processor, a second object type associated with the second unstructured data object based on the second system metadata; and store the second system metadata in a second entry of a second metadata table.

In general, certain embodiments described herein relate to a non-transitory computer readable medium that includes computer readable program code, which when executed by a computer processor enables the computer processor to perform a method for managing metadata for unstructured data. The method may include identifying a first storage event associated with a first unstructured data object; in response to identifying the first storage event: streaming, from a storage resource, first system metadata associated with the first unstructured data object; identifying, using a first system metadata processor, a first object type associated with the first unstructured data object based on the first system metadata; storing the first system metadata in a first entry of a first metadata table; streaming second system metadata associated with a second unstructured data object; identifying, using the first system metadata processor, a second object type associated with the second unstructured data object based on the second system metadata; and storing the second system metadata in a second entry of a second metadata table, wherein the second metadata is queried to obtain the first unstructured data object.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and non-transitory computer readable mediums for extracting and using metadata for unstructured data.

Data clusters may store data as unstructured data. In one or more embodiments, unstructured data may refer to one or more data structures or repositories that include large volumes of data generated at a high velocity (e.g., security cameras generating non-stop video files). Additionally the unstructured data (124) may include a large variety of different types of data objects. The data objects may include, for example, text files, PDF files, JPEG files, MP4 files, and/or DICOM files. The unstructured data objects may include other and/or additional types of files without departing from embodiments disclosed herein. In one or more embodiments, the unstructured data (124) may include only limited metadata (e.g., system metadata). As a result, the unstructured data (124) may be difficult or unable to be consumed by other entities (e.g., clients) for data analytics purposes and/or to perform computer implemented services.

Embodiments disclosed herein may address, at least in part, the aforementioned issues. Embodiments disclosed herein may relate to a metadata manager that identifies storage events associated with new unstructured data objects. In response to identifying storage events, the metadata manager performs two stage metadata extraction for newly stored unstructured objects. The first stage may include extracting system metadata. The second stage may include extracting advanced metadata based on the object type associated with the extracted metadata. To perform the two stage metadata extraction, the metadata processors may include a system metadata processor (not shown) and one or more object type metadata processors (not shown). In one or more embodiments, the one or more system metadata processors may perform the first stage of the metadata extraction. Accordingly, the one or more system metadata processors may obtain metadata streams, extract system metadata from the metadata streams, determine object types associated with the extracted system metadata, store the system metadata in the appropriate object type metadata table, and initiate the second stage of metadata, if necessary, by the appropriate object type metadata processor. The system metadata processor and the object type metadata processors may store system metadata and advanced metadata in object type metadata tables corresponding to the object types of unstructured data objects. The object type metadata tables may be used to perform traditional metadata queries. As a result, the accessibility and flexibility associated with unstructured data may be improved.

Embodiments disclosed herein may be seamlessly integrated with edge, core, and cloud domains. The metadata processors and the metadata tables may be customizable, further improving the flexibility of the system. As a result, the efficiency, cost, and accuracy of product procurement may be greatly improved.

Figure 1A:
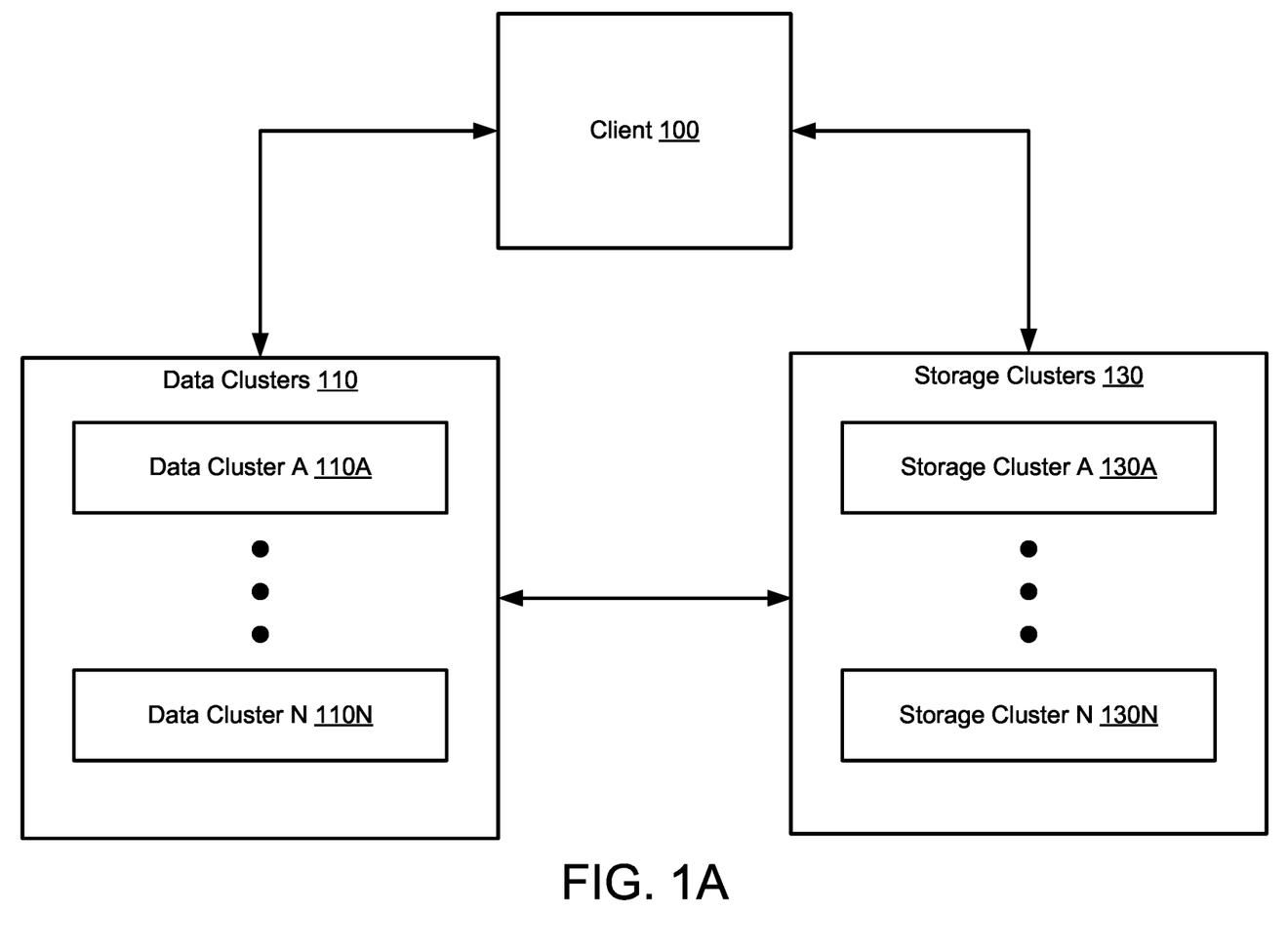
FIG. 1A shows a diagram of a system in accordance with one or more embodiments disclosed herein.

FIG. 1A shows a diagram of a system in accordance with one or more embodiments disclosed herein. The system may include a client (100) data clusters (110), and storage clusters (130). The components of the system illustrated in FIG. 1A may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the client (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the client (100) described herein and/or all, or a portion, of the methods illustrated in FIGS. 2A-2B. The client (100) may be implemented using other types of computing devices without departing from the embodiments disclosed herein. For additional details regarding computing devices, refer to FIG. 3.

The client (100) may be implemented using logical devices without departing from the embodiments disclosed herein. For example, the client (100) may include virtual machines that utilize computing resources of any number of physical computing devices to provide the functionality of the client (100). The client (100) may be implemented using other types of logical devices without departing from the embodiments disclosed herein.

In one or more embodiments, the client (100) may include the functionality to, or otherwise be programmed or configured to, perform computer implemented services. The computer implemented services may include, for example, database services, classification services, inferencing services, data processing services, etc. The computer implemented services may include other and/or additional computer implemented services without departing from embodiments disclosed herein. To perform the computer implemented services, the client (100) may include the functionality to store and/or obtain unstructured data in the data clusters (110) and/or the storage clusters (130). The client (100) may include the functionality to perform all, or a portion of, the methods discussed in FIGS. 2A-2B. The client (100) may include other and/or additional functionalities without departing from embodiments disclosed herein. For additional information regarding the functionality of the client (100), refer to FIGS. 2A-2B.

In one or more embodiments, the data clusters (110) may include the functionality to, or may be otherwise programmed or configured to, store unstructured data generated by the client (100) and/or other entities not shown in system of FIG. 1A. The data clusters (110) may also perform metadata extraction services and metadata query services for the unstructured data stored in the data clusters (110) and/or the storage clusters (130). The data clusters (110) may include the functionality to perform all, or a portion of, the methods of FIGS. 2A-2B. The data clusters (110) may include other and/or additional functionalities without departing from embodiments disclosed herein. For additional information regarding the data clusters (110), refer to FIG. 1B.

In one or more embodiments, the data clusters (110) may include any quantity of data clusters without departing from embodiments disclosed herein. For example, the data clusters (110) may include data cluster A (110A) and data cluster N (110N).

In one or more embodiments, the storage clusters (130) may include the functionality to, or may be otherwise programmed or configured to, store unstructured data generated by the client (100) and/or other entities not shown in the system of FIG. 1A. The storage clusters (130) may include any quantity of storage clusters without departing from embodiments disclosed herein. For example, the storage clusters may include storage cluster A (130A) and storage cluster N (130N). The storage clusters (130) may include other and/or additional functionalities without departing from embodiments disclosed herein.

In one or more embodiments, to perform the aforementioned functionality of the storage clusters (130), the storage clusters (130) may include one or more storage nodes (not shown).

In one or more embodiments, the storage nodes may be implemented as one or more computing devices (see e.g., FIG. 3), operatively connected to (but separate from) other storage nodes in the storage cluster (130). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the storage nodes described throughout this application.

In one or more embodiments, the storage nodes may be implemented as one or more logical devices. The logical device may be, for example, a virtual machine that utilizes the computing resources of any number of computing devices and thereby provides the functionality of the storage nodes described throughout this application.

In one or more embodiments, the storage nodes may include any quantity of storage nodes without departing from embodiments disclosed herein. In one or more embodiments, each storage node may be included in a particular domain (not shown), and therefore may include particular computing resources. The domains may include an edge domain, a core domain, and/or a cloud domain. Accordingly, a storage node of the storage nodes may be an edge storage node, a core (e.g., a data center) storage node, or a cloud storage node. The storage nodes in each domain may include different quantities and/or types of computing resources. For example, an edge storage node may include sensors collecting data, controllers controlling the sensors, desktop devices, mobile devices, etc. A core storage node may have computing resources that include servers with more compute ability than the edge storage nodes. A cloud storage node may include still more powerful and/or more quantities of computing resources than the core storage nodes. The storage nodes may include any quantity of edge storage nodes, core storage nodes, and/or cloud storage nodes without departing from embodiments disclosed herein.

As discussed above, the storage nodes may include the functionality to store data in the storage cluster (130). The storage nodes may store data in storages (not shown). The storages may include non-volatile storage and/or memory. In one or more embodiments, the non-volatile storage and/or memory of a storage node or storage nodes may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, the storage nodes store unstructured data. Because unstructured data may be stored in storage clusters and metadata tables may be stored in data clusters, the unstructured data and the extracted metadata associated with the unstructured data may be stored on different entities.

Although the system of FIG. 1A is shown as having a certain number of components (e.g., 100, 110, 130), in other embodiments disclosed herein, the system may have more or fewer components (e.g., only a client (100) and data clusters (110)). For example, the functionality of each component described above may be split across components or combined into a single component. Further still, each component may be utilized multiple times to carry out an iterative operation.

Figure 1B:
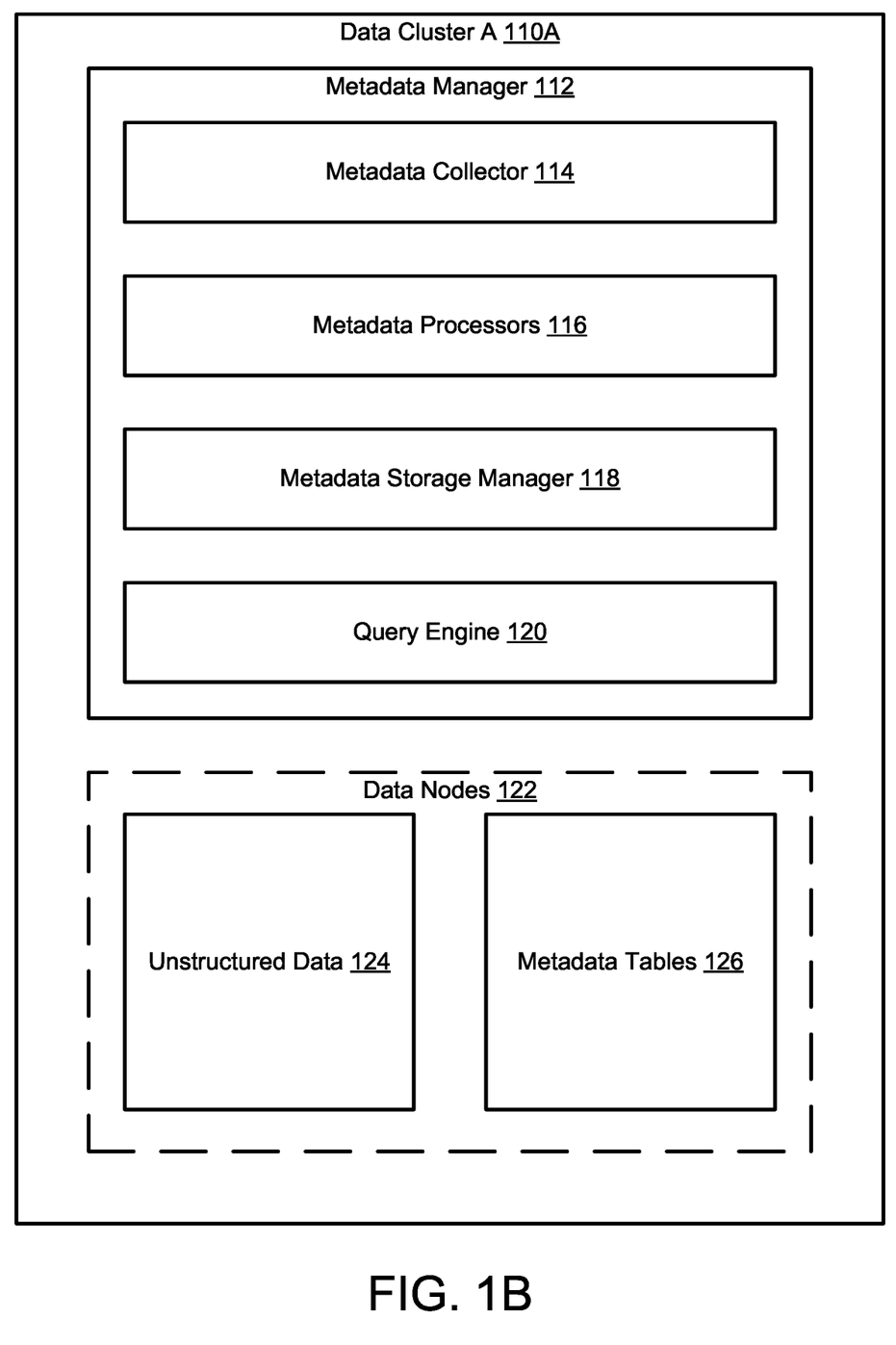
FIG. 1B shows a diagram of a data cluster in accordance with one or more embodiments disclosed herein.

FIG. 1B shows a diagram of a data cluster in accordance with one or more embodiments disclosed herein. Data cluster A (110A) may be an embodiment of the data clusters (110, FIG. 1A) discussed above. As discussed above, the data cluster (110) may include the functionality to store data and perform metadata extraction services and metadata query services associated with the data stored in the data cluster (110A), data stored on other data clusters (e.g., 110N), or data stored on storage clusters (130). To perform the aforementioned services, data cluster A (110A) may include a metadata manager (112) and data nodes (122). The components of data cluster A (110A) (e.g., the metadata manager (112) and the data nodes (122)) may be operatively connected via any combination of wired and/or wireless connections. Data cluster A (110A) may include other, additional, and/or fewer components without departing from embodiments disclosed herein. Each of the aforementioned components of data cluster A (110A) is discussed below.

In one or more embodiments, the metadata manager (112) may be implemented as a computing device (see e.g., FIG. 3), and is operatively connected to (but separate from) the data nodes (122) in data cluster A (110A). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the metadata manager (112) described throughout this application and/or all, or a portion thereof, of the methods illustrated in FIGS. 2A-2B.

In one or more embodiments of the invention, the metadata manager (112) is implemented as a logical device. The logical device may be, for example, a virtual machine that utilizes the computing resources of any number of computing devices (e.g., data nodes (122)) and thereby provides the functionality of the metadata manager (112) described throughout this application and/or all, or a portion thereof, of the methods illustrated in FIG. 2A-2B.

In one or more embodiments, the metadata manager (112) may include the functionality to perform the metadata extraction services and the metadata query services of data cluster A (110A). To perform the aforementioned services, the metadata manager (112) may include a metadata collector (114), metadata processors (116), a metadata storage manager (118), and a query engine (120). The metadata manager (112) may include other, additional, and/or fewer components without departing from embodiments disclosed herein. Each of the aforementioned components of the metadata manager (112) are discussed below.

In one or more embodiments, the metadata collector (114) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the metadata collector (114) described throughout this Detailed Description and/or all, or a portion thereof, of the method illustrated in FIG. 2A.

Figure 2A:
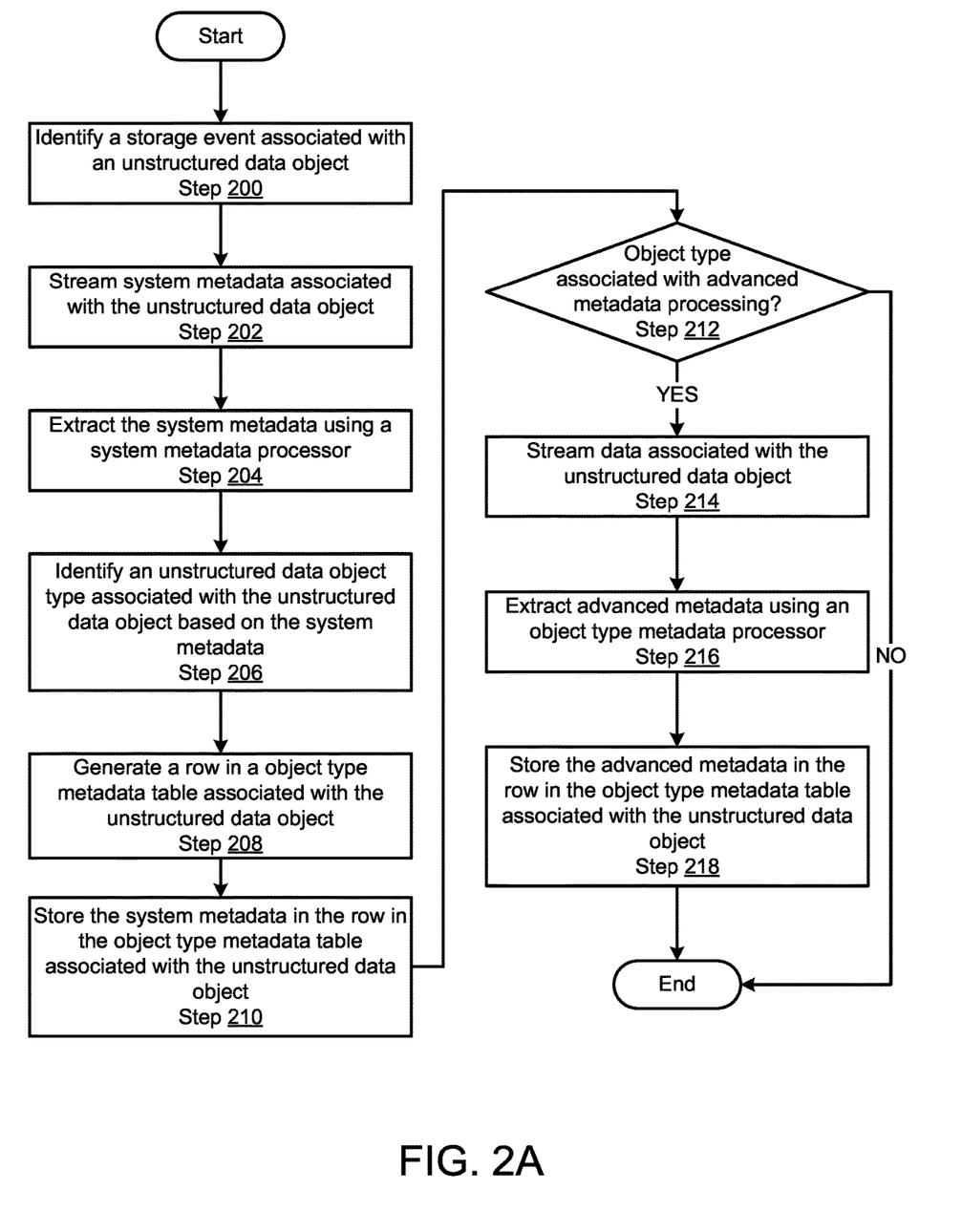
FIG. 2A shows a flowchart of a method for extracting metadata from unstructured data in accordance with one or more embodiments disclosed herein.

In one or more of embodiments, the metadata collector (114) may be implemented as computer instructions, e.g., computer code, stored on a storage (not shown) of the metadata manager (112) that when executed by a processor of the metadata manager (112) causes the metadata manager (112) to provide the aforementioned functionality of the metadata collector (114) described throughout this Detailed Description and/or all, or a portion thereof, of the method illustrated in FIG. 2A.

In one or more embodiments, the metadata collector (114) may be a device (physical or logical) that includes the functionality to perform a portion of the metadata extraction services of data cluster A (110A). The portion of the metadata extraction services performed by the metadata collector (114) may include scanning, or otherwise monitoring, storages of data nodes (122) of data clusters (110) and/or storage nodes of storage clusters (130) for storage events, streaming metadata associated with the storage events to metadata processors (116), and streaming data to the metadata processors (116). The metadata collector (114) may include the functionality to perform all, or a portion of, the method of FIG. 2A. For additional information regarding the functionality of the metadata collector (114), refer to FIG. 2A. The metadata collector (114) may include other and/or additional functionalities without departing from embodiments disclosed herein.

In one or more embodiments, the metadata processors (116) may be implemented as physical devices. A physical device may include circuitry. A physical device may be, for example, a field-programmable gate array, application specific integrated circuit, programmable processor, microcontroller, digital signal processor, or other hardware processor. The physical devices may be configured to provide the functionality of the metadata processors (116) described throughout this Detailed Description and/or all, or a portion thereof, of the method illustrated in FIG. 2A.

In one or more of embodiments, the metadata processors (116) may be implemented as computer instructions, e.g., computer code, stored on a storage (not shown) of the metadata manager (112) that when executed by a processor of the metadata manager (112) causes the metadata manager (112) to provide the aforementioned functionality of the metadata processors (116) described throughout this Detailed Description and/or all, or a portion thereof, of the method illustrated in FIG. 2A.

In one or more embodiments, the metadata processors (116) may be a device (physical or logical) that includes the functionality to perform a portion of the metadata extraction services of data cluster A (110A). The portion of the metadata extraction services performed by the metadata processors (116) may include obtaining metadata streams associated with storage events, processing metadata streams to extract metadata, determining object types associated with the extracted metadata, and storing the extracted metadata in appropriate metadata tables (126, discussed below). The metadata processors (116) may include the functionality to perform all, or a portion of, the method of FIG. 2A. For additional information regarding the functionality of the metadata processors (116), refer to FIG. 2A. The metadata processors (116) may include other and/or additional functionalities without departing from embodiments disclosed herein.

In one or more embodiments, the metadata processors (116) may perform two stage metadata extraction. The first stage may include extracting system metadata. The second stage may include extracting advanced metadata based on the object type associated with the extracted metadata. To perform the two stage metadata extraction, the metadata processors may include one or more system metadata processors (not shown) and one or more object type metadata processors (not shown). In one or more embodiments, the one or more system metadata processors may perform the first stage of the metadata extraction. Accordingly, the one or more system metadata processors may obtain metadata streams, extract system metadata from the metadata streams, determine object types associated with the extracted system metadata, store the system metadata in the appropriate object type metadata table, and initiate the second stage of metadata, if necessary, by the appropriate object type metadata processor.

In one or more embodiments, the object type metadata processors may perform the second stage of metadata extraction. The second stage of metadata extraction may include performing object type specific advanced metadata extraction on data streams associated with the extracted metadata and storing the advanced metadata in the appropriate object type metadata table and table location. Each object type metadata processor may include the functionality to perform advanced metadata processing to extract advanced metadata corresponding to data of a particular object type. For example, a PDF metadata processor may include the functionality to extract advanced metadata from PDF data, a JPEG metadata processor may include the functionality to extract advanced metadata from JPEG data, a DICOM metadata processor may include the functionality to extract advanced metadata from DICOM data, an MP4 metadata processor may include the functionality to extract advanced metadata from MP4 data, etc. There may be any object type metadata processor that includes the functionality to extract any advanced metadata from any object type data without departing from embodiments disclosed herein. In one or more embodiments, the user of data cluster A (110A) may configure the metadata processors (116) to include any desirable object type metadata processors without departing from embodiments disclosed herein.

In one or more embodiments, the metadata storage manager (118) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the metadata storage manager (118) described throughout this Detailed Description and/or all, or a portion thereof, of the method illustrated in FIG. 2A.

In one or more of embodiments, the metadata storage manager (118) may be implemented as computer instructions, e.g., computer code, stored on a storage (not shown) of the metadata manager (112) that when executed by a processor of the metadata manager (112) causes the metadata manager (112) to provide the aforementioned functionality of the metadata storage manager (118) described throughout this Detailed Description and/or all, or a portion thereof, of the method illustrated in FIG. 2A.

In one or more embodiments, the metadata storage manager (118) may include the functionality to perform a portion of the metadata extraction services and a portion of the metadata query services of data cluster A (110A). To perform the aforementioned services, the metadata storage manager (118) may include the functionality to maintain a metadata table catalog and a search index associated with the metadata tables. The metadata table catalog may be one or more data structures that include metadata table entries. Each metadata table entry may be associated with an object type metadata table. Each metadata table entry may include information associated with the corresponding object type metadata table. The information may include, for example, a metadata table identifier, a storage location associated with the object type metadata table, and an object type identifier associated with the object type (e.g., PDF, JPEG, MP4, DICOM, folder, file, etc.) associated with the corresponding object type metadata table. The metadata table catalog may include other and/or additional information associated with the metadata tables without departing from embodiments disclosed herein. In one or more embodiments, the search index may refer to one or more data structures that may be used to perform searches of the metadata tables. The index may include all, or a portion, of the contents of the metadata tables. The metadata storage manager (118) may include other and/or additional functionalities without departing from embodiments disclosed herein.

The query engine (120) may include the functionality to perform queries of the metadata tables. The query engine (120) may include the functionality to perform the method of FIG. 2B. For additional information regarding the functionality of the query engine (120), refer to FIG. 2B. The query engine (120) may include other and/or additional functionalities without departing from embodiments disclosed herein.

In one or more embodiments, the query engine (120) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the query engine (120) described throughout this Detailed Description.

Figure 2B:
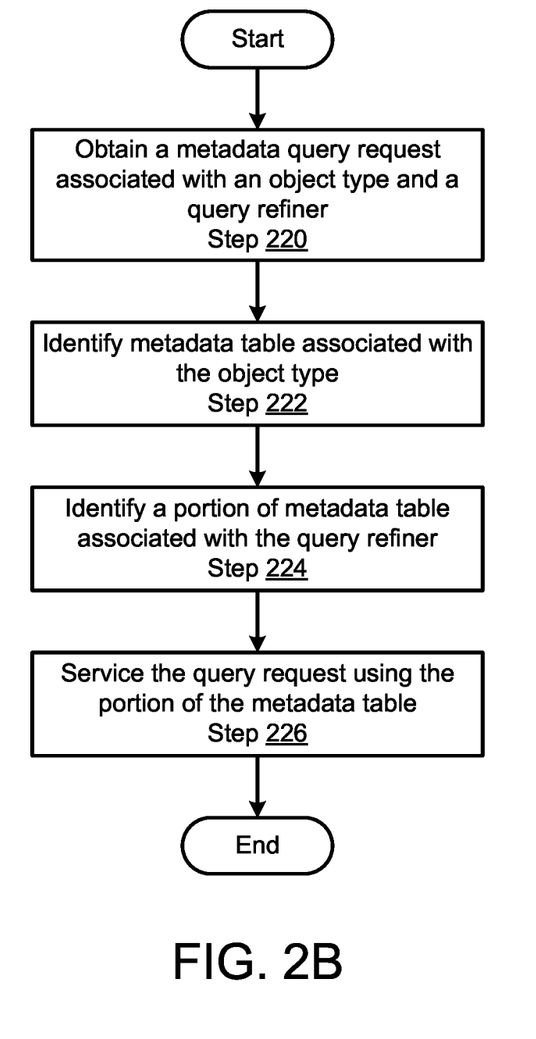
FIG. 2B shows a flowchart of a method for performing a metadata query in accordance with one or more embodiments disclosed herein.

In one or more of embodiments, the query engine (120) may be implemented as computer instructions, e.g., computer code, stored on a storage (not shown) of the metadata manager (120) that when executed by a processor of the metadata manager (120) causes the metadata manager (120) to provide the aforementioned functionality of the query engine (120) described throughout this application and/or all, or a portion thereof, of the method illustrated in FIG. 2B.

In one or more embodiments, the data nodes (122) may be implemented as one or more computing devices (see e.g., FIG. 3), and is operatively connected to (but separate from) the metadata manager (112) in data cluster A (110A). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data nodes (122) described throughout this application and/or all, or a portion thereof, of the methods illustrated in FIGS. 2A-2B.

In one or more embodiments, the data nodes (122) may be implemented as one or more logical devices. The logical device may be, for example, a virtual machine that utilizes the computing resources of any number of computing devices and thereby provides the functionality of the data nodes (122) described throughout this application and/or all, or a portion thereof, of the methods illustrated in FIGS. 2A-2B.

In one or more embodiments, the data nodes may include any quantity of data nodes without departing from embodiments disclosed herein. In one or more embodiments, each data node may be included in a particular domain (not shown), and therefore may include particular computing resources. The domains may include an edge domain, a core domain, and/or a cloud domain. Accordingly, a data node of the data nodes (122) may be an edge data node, a core (e.g., a data center) data node, or a cloud data node. The data nodes in each domain may include different quantities and/or types of computing resources. For example, an edge data node may include sensors collecting data, controllers controlling the sensors, desktop devices, mobile devices, etc. A core data node may have computing resources that include servers with more compute ability than the edge data nodes. A cloud data node may include still more powerful and/or more quantities of computing resources than the core data nodes. The data nodes (122) may include any quantity of edge data nodes, core data nodes, and/or cloud data nodes without departing from embodiments disclosed herein.

As discussed above, the data nodes (122) may include the functionality to store data in data cluster A (110A). The data nodes (122) may store data in storages (not shown). The storages may include non-volatile storage and/or memory. In one or more embodiments, the non-volatile storage and/or memory of a data node or data nodes (122) may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, the data nodes (122) store unstructured data (124) and metadata tables (126). In one or more embodiments, unstructured data (124) may refer to one or more data structures or repositories that include large volumes of data generated at a high velocity (e.g., security cameras generating non-stop video files). Additionally the unstructured data (124) may include a large variety of different types of data objects. The data objects may include, for example, files, folders, text files, PDF files, JPEG files, MP4 files, and/or DICOM files. The data objects may include other and/or additional types of files without departing from embodiments disclosed herein. In one or more embodiments, the unstructured data (124) may include only limited metadata (e.g., system metadata). As a result, the unstructured data (124) may be difficult to consume for data analytics purposes without using advanced metadata extraction techniques to generate additional metadata (e.g., advanced metadata). As a result, the metadata manager (112) may perform metadata extraction services on the unstructured data (124) as discussed throughout this Detailed Description.

The unstructured data (124) may be stored in the data cluster as shown in FIG. 1B. In other embodiments, all, or a portion of, the unstructured data (124) may be stored in a storage cluster. In one or more embodiments, if the unstructured data (124) is stored exclusively in a storage cluster, then the data nodes (122) of the data cluster (e.g., 110A) may not include unstructured data (124) and may only include metadata tables (126).

In one or more embodiments, the metadata tables (126) may include one or more data structures that include tables of metadata extracted from the unstructured data (124) by the metadata manager (112). For additional information regarding the metadata tables (126), refer to FIG. 1C.

Figure 1C:
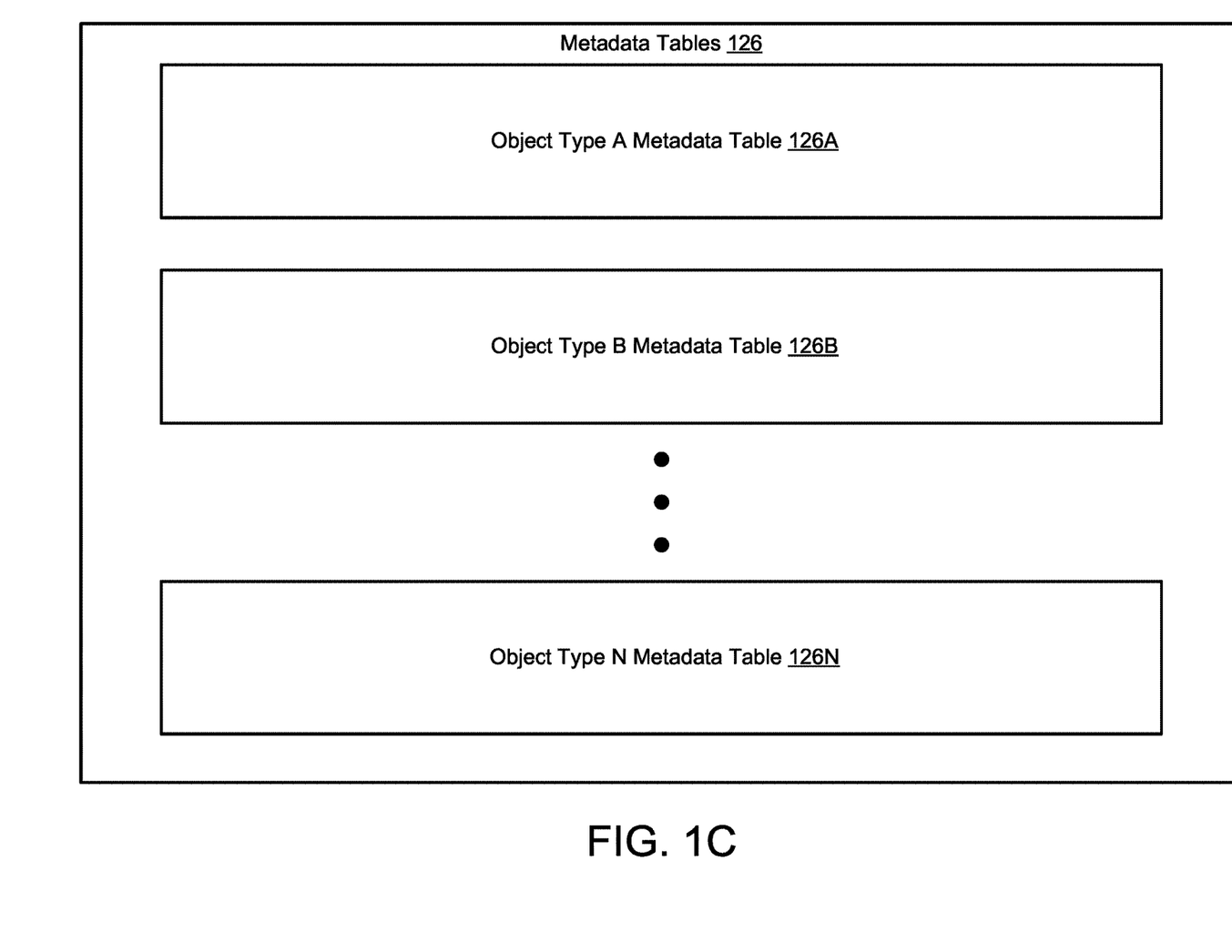
FIG. 1C shows a diagram of metadata tables in accordance with one or more embodiments disclosed herein.

FIG. 1C shows a diagram of metadata tables in accordance with one or more embodiments disclosed herein. The metadata tables (126) may be an embodiment of the metadata tables (126, FIG. 1B) discussed above. In one or more embodiments, the metadata tables include one or more object type metadata tables. For example, the metadata tables may include object type A metadata table (126A), object type B metadata table (126B), and object type N metadata table (126N). Each metadata table may be associated with a particular object type. For example, object type A metadata table (126A) may be associated with DICOM files and therefore include rows associated with DICOM files stored in the unstructured data (124, FIG. 1B). As another example, object type B metadata table (126B) may be associated with PDF files and therefore include rows associated with PDF files stored in the unstructured data (124, FIG. 1B). Each object type metadata table may be implemented using an open table format table (e.g., Iceberg table). As a result, vendor lock-in may be avoided for metadata querying and data analytics using the metadata included in the metadata tables (126). Other table formats may be used for the metadata tables (126) without departing from embodiments disclosed herein.

In one or more embodiments, each metadata table may include rows and columns. Each row may be associated with an object (e.g., file or folder) in the unstructured data (124, FIG. 1B). Each column may include a particular metadata property associated with the corresponding objects. In one or more embodiments, each metadata table may include system metadata. In one or more embodiments, system metadata may refer to generic metadata associated with an object that may be included in the unstructured data. The system metadata may include, for example, a file URL, a file name, a file path, an object type, a file size, a creation time, a modification time, an access time, a file hash or checksum, and/or a file status. The system metadata may include other and/or additional information or metadata properties associated with the object without departing from embodiments disclosed herein. Each object type metadata table (e.g., 126A, 126B, 126N) may include the same or similar system metadata. One or more of the object type metadata tables may only include system metadata and not further include advanced metadata.

In one or more embodiments, an object type metadata table may further include advanced metadata. Depending on the object type, the advanced metadata may include context metadata and/or content metadata. The context metadata and/or the content metadata may vary from one object type to the next. For example, for a DICOM metadata table, the content metadata may include image encoding, physical objects identified in the image, and/or a content preview (e.g., a binary preview). The context metadata of the DICOM metadata table may include a patient name, a patient's medical condition, doctor name associated with the patient, the hospital or facility in which the DICOM file was generated, and/or the date in which the medical exam was conducted. As another example, a folder metadata table may only include content metadata that may include a total number of files, the total number of sub-folders, the total size of the folder, a time histogram, a file type histogram, business tags, etc. The advanced metadata may include any other and/or additional object type specific information or metadata properties associated with an object without departing from embodiments disclosed herein.

FIG. 2A shows a flowchart of a method for extracting metadata from unstructured data in accordance with one or more embodiments disclosed herein. The method shown in FIG. 2A may be performed by, for example, a metadata manager (e.g., 112, FIG. 1B). Other components of the system in FIGS. 1A-1B may perform all, or a portion, of the method of FIG. 2A without departing from the scope of the embodiments described herein. While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a storage event associated with an unstructured data object is identified. In one or more embodiments, the metadata collector of the metadata manager may identify a storage event associated with an unstructured data object. In one or more embodiments, the metadata collector may monitor one or more data nodes of the data clusters or storage nodes of the storage clusters to identify when new unstructured data objects are stored. In one embodiment, the metadata collector may monitor or scan the data nodes in real time or near real time, and identify when new unstructured data objects are stored on the data nodes. In another embodiment, the metadata collector may periodically scan the data node storages according to a schedule (e.g., every five minutes, every hour, etc.) to identify newly stored unstructured data objects. In still another embodiment, the metadata collector may check audit logs of data nodes to identify newly stored unstructured data objects. An audit log may refer to a data structure that specifies events (including newly stored unstructured data objects) associated with a data node. In yet another embodiment, a user may submit a request to the metadata collector via the client to scan one or more data nodes for newly stored unstructured data objects. The identification of a newly stored unstructured data object may be also be referred to as identifying a storage event. The storage event associated with the unstructured data object may be identified via other and/or additional methods without departing from embodiments disclosed herein.

In Step 202, system metadata associated with the unstructured data object is streamed. In one or more embodiments, as discussed above, the metadata collector may identify a storage event associated with the unstructured data object. In response to identifying the storage event, the metadata collector may initiate the streaming of system metadata associated with the unstructured data object from the data node or the storage node to a system metadata processor of the metadata manager. The system metadata may be streamed to the system metadata processor using any appropriate method of data streaming without departing from embodiments disclosed herein. For example, the metadata collector may request the data node to place the system metadata in a system metadata stream queue on the data node, which then streams each system metadata included in the queue in order to the system metadata processor over a wired or wireless network via one or more stream application programming interfaces (APIs) (not shown in FIG. 1A). The system metadata associated with the unstructured data object may be obtained via other and/or additional methods without departing from embodiments disclosed herein.

In Step 204, the system metadata is extracted using a system metadata processor. In one or more embodiments, the system metadata processor may parse the obtained system metadata associated with the unstructured data object to extract the system metadata values from the system metadata. The system metadata may be extracted via other and/or additional methods without departing from embodiments disclosed herein.

In Step 206, an object type associated with the unstructured data object is identified based on the system metadata. In one or more embodiments, as discussed above, the system metadata may include information that may specify the object type of the unstructured data object. For example, the system metadata may include the file name, which may further include a file extension that may specify the object type of the unstructured data objects. In another embodiment, the system metadata may directly specify the object type of the unstructured data object via an object type identifier associated with a particular object type. The system control processor may check the extracted system metadata (e.g., the object type identifier or a file extension) to identify the object type associated with the unstructured data object. An object type associated with the unstructured data object may be identified via other and/or additional methods without departing from embodiments disclosed herein.

In Step 208, a row is generated in the object type metadata table associated with the unstructured data object. As discussed above, an object type metadata data table may be associated with the identified object type of the unstructured data object. The system metadata processor may include, or otherwise have access to, a metadata table catalog. As discussed above, the metadata table catalog may include entries associated with each object type metadata table. The entries may specify the object type associated with each corresponding object type metadata table. The system metadata processor may identify the object type metadata table associated with the identified object type using the metadata table catalog entries. Additionally, the system metadata processor may then generate a new row in the object type metadata table. The row may be generated in the object type metadata table associated with the unstructured data object via other and/or additional methods without departing from embodiments disclosed herein.

In Step 210, the system metadata is stored in the row of the object type metadata table associated with the unstructured data object. In one or more embodiments, the system metadata processor may store the extracted metadata property values associated with the unstructured data object in the newly generated row of the object type metadata table. In one or more embodiments disclosed herein, the system metadata processor may store the system metadata properties of the unstructured data object in the proper corresponding columns of the object type metadata table. For example, the file name may be stored in the file name column of the, the file size may be stored in the file size column, the file URL may be stored in the file URL column, the object type may be stored in the object type column, the file path may be stored in the file path column, the creation time may be stored in the creation time column, etc. In one or more embodiments, the system metadata may be grouped by rows before writing to the storage associated with the object type metadata table to improve writing efficiency. The system metadata may be stored in the object type metadata table in accordance with the specific table format associated with the object type metadata table and/or the storage. The system metadata may be stored in the row of the object type metadata table associated with the unstructured data object via other and/or additional methods without departing from embodiments disclosed herein.

In Step 212, a determination is made as to whether the object type of the unstructured data object is associated with advanced metadata processing. In one or more embodiments, the system metadata processor may include a list of object type metadata processors and the object types associated with each object type metadata processor. In one or more embodiments, the system control processor may compare the object type of the unstructured data object with the object types associated with the object type metadata processors. In one or more embodiments disclosed herein, if the object type of the unstructured data object matches the object type associated with one or more object type metadata processors, then the system metadata processor may determine that the object type of the unstructured data object is associated with advanced metadata processing. In one or more embodiments disclosed herein, if the object type of the unstructured data object does not match the object type associated with any of the object type metadata processors, then the system metadata processor may determine that the object type of the unstructured data object is not associated with advanced metadata processing. The determination as to whether the unstructured data object is associated with advanced metadata processing may be made via other and/or additional methods without departing from embodiments disclosed herein.

In one or more embodiments disclosed herein, if it is determined that the object type of the unstructured data object is associated with advanced metadata processing, then the method proceeds to Step 214. In one or more embodiments disclosed herein, if it is determined that the object type of the unstructured data object is not associated with advanced metadata processing, then the method ends following Step 212.

In Step 214, data associated with the unstructured data object is streamed. In one or more embodiments, system metadata processor may request the metadata collector to stream the data of the unstructured data object to one or more object type metadata processors corresponding to the object type of the unstructured data object. In response to obtaining the request, the metadata collector may initiate the streaming of data associated with the unstructured data object from the data node or storage node to one or more object type metadata processors of the metadata manager. The data may be streamed to an object type metadata processor using any appropriate method of data streaming without departing from embodiments disclosed herein. For example, the metadata collector may request the data node to place the data of the unstructured data object in a data stream queue on the data node, which then streams the each unstructured data object data included in the queue to the corresponding object type metadata processor over a wired or wireless network via one or more stream application programming interfaces (APIs) (not shown in FIG. 1A). The data associated with the unstructured data object may be streamed via other and/or additional methods without departing from embodiments disclosed herein.

In Step 216, advanced metadata is extracted using an object type metadata processor. In one or more embodiments, the object type metadata processor may perform advanced metadata extraction by applying one or more data analytics models to the unstructured object data. When the data analytics models are applied to the unstructured object data, the data analytics models may generate advanced metadata properties associated with the unstructured object. The data analytics models may be trained or otherwise configured to predict or extract advanced metadata from the object type associated with the unstructured data object. The data analytics models may vary from one object type metadata processor to the other. The data analytics models may include any type of artificial intelligence, machine learning, and/or deep learning models without departing from embodiments disclosed herein. For example, the data analytics models may include a natural language processing model (e.g., for text files or PDF files), tree-based machine learning models (e.g., random forest models), support vector machines, K-nearest neighbor models, artificial neural networks, convolutional neural networks, naive Bayesian classifiers, logistic regression models, etc. Other and/or additional types of data analytics models may be used by the object type metadata processors to extract advanced metadata from the unstructured object data. Advanced metadata may be extracted using the object type metadata processor via other and/or additional methods without departing from embodiments disclosed herein.

In Step 218, the advanced metadata is stored in the row of the object type metadata table associated with the unstructured data object. In one or more embodiments, the object type metadata processor may store the extracted advanced metadata property values associated with the unstructured data object in the newly generated row of the object type metadata table. In one or more embodiments disclosed herein, the object type metadata processor may store the advanced metadata properties of the unstructured data object in the proper corresponding columns of the object type metadata table. For example, for a DICOM file, the image encoding may be stored in the image encoding column, physical objects identified in the image may be stored in the identified physical objects column, a content preview (e.g., a binary preview) may be stored in the content preview column, a patient name may be stored in the patient name column, a patient's medical condition may be stored in the medical condition column, etc. As another example, a for a folder, a total number of files may be stored in the total number of files column, the total number of sub-folders may be stored in the total number of sub-folders column, the total size of the folder may be stored in total size of the folder column, business tags in the business tag column, etc. In one or more embodiments, the advanced metadata may be grouped by rows before writing to the storage associated with the object type metadata table to improve writing efficiency. The advanced metadata may be stored in the object type metadata table in accordance with the specific table format associated with the object type metadata table and/or the storage. The advanced metadata may be stored in the row of the object type metadata table associated with the unstructured data object via other and/or additional methods without departing from embodiments disclosed herein.

The system metadata may be stored in the row of the object type metadata table associated with the unstructured data object via other and/or additional methods without departing from embodiments disclosed herein.

In or more embodiments disclosed herein, the method ends following Step 218.

FIG. 2B shows a flowchart of a method for performing a metadata query in accordance with one or more embodiments disclosed herein. The method shown in FIG. 2B may be performed by, for example, a metadata manager (e.g., 112, FIG. 1B). Other components of the system in FIGS. 1A-1B may perform all, or a portion, of the method of FIG. 2B without departing from the scope of the embodiments described herein. While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a metadata query request associated with an object type and a query planner and optimizer is obtained. In one or more embodiments, a client or a user of the client may submit a query request to the query engine of the metadata manager. In one or more embodiments, the query request may also include an object type and a query planner and optimizer. In one or more embodiments, a query planner and optimizer may refer to a query condition that may be used to refine a metadata search. The query condition may limit the metadata properties of a metadata column used to service the query request. The query planner and optimizer may include one or more query conditions. The query planner and optimizer may include any type of query condition associated with the metadata properties of the metadata tables without departing from embodiments disclosed herein. For example, a query planner and optimizer may specify only metadata values associated with user data objects created within the last six hours. As another example, a query planner and optimizer may set a query condition for only images that include traffic lights. As yet another example, a query planner and optimizer may set a condition for no files above 500 MB in size. The metadata query request associated with an object type and a query planner and optimizer may be obtained via other and/or additional methods without departing from embodiments disclosed herein.

In Step 222, an object type metadata table associated with the object type is identified. As discussed above, the query request may include or specify an object type. In one or more embodiments, the query engine may use a metadata table catalog maintained by the metadata storage manager to identify the object type metadata table associated with the object type. As discussed above, the metadata table catalog may include entries associated with each object type metadata table. The entries may specify the object type associated with each corresponding object type metadata table. The query engine may identify the object type metadata table associated with the identified object type using the metadata table catalog entries. The object type metadata table associated with the object type may be identified via other and/or additional methods without departing from embodiments disclosed herein.

In Step 224, a portion of the object type metadata table is identified based on the query planner and optimizer. In one or more embodiments, the query engine identifies a portion of the object type metadata table based on the query planner and optimizer. As discussed above, the query planner and optimizer may set one or more conditions on the metadata properties included in the object type metadata table. The query manager may apply the conditions to one or more columns of the object type metadata table to identify a portion of the rows with column values that satisfy the query planner and optimizer. The portion of the object type metadata table may be identified based on the query planner and optimizer via other and/or additional methods without departing from embodiments disclosed herein.

In Step 226, the query request is serviced using the portion of the object type metadata table. In one or more embodiments, the query engine may use the portion of the object type metadata table to service the query request. In one embodiment, the query engine may copy the portion of the object type metadata table and provide the portion of the object type metadata to the client to service the query request. In another embodiment, the query engine may send or otherwise initiate the transmission of unstructured data object data associated with the portion of the object type metadata table to the client to service the query request. The client may use the obtained unstructured data objects data and/or the portion of the object type metadata table to perform computer implemented services (e.g., model training, further data processing, etc.). The query request may be serviced using the portion of the object type metadata table via other and/or additional methods without departing from embodiments disclosed herein.

In one or more embodiments disclosed herein, the method ends following Step 226.

Figure 3:
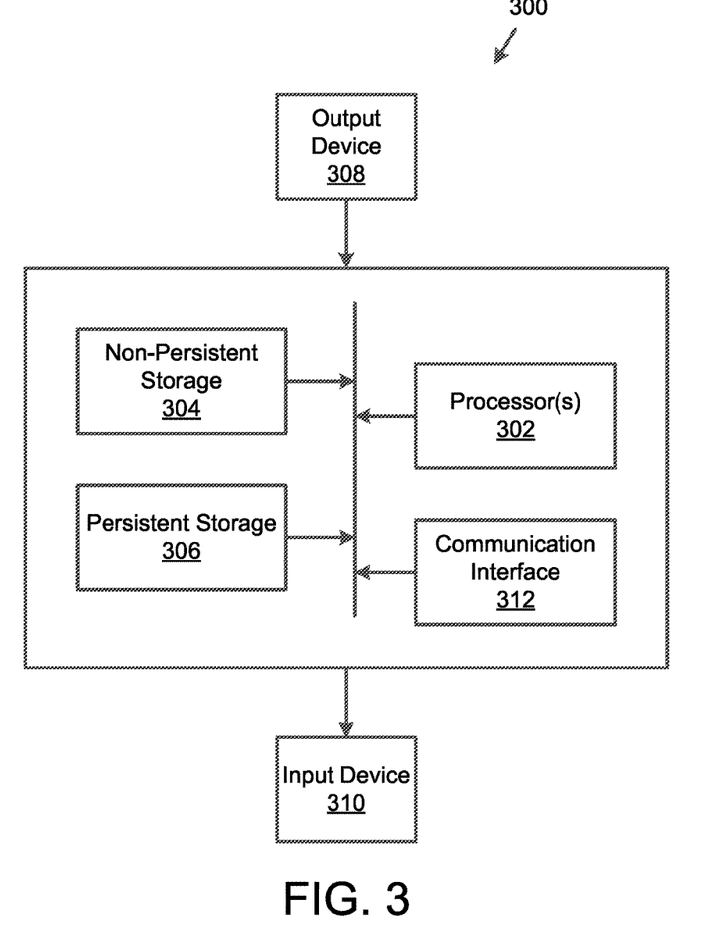
FIG. 3 shows a diagram of a computing device in accordance with one or more embodiments disclosed herein.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing metadata associated with unstructured data, comprising:
   identifying a first storage event associated with a first unstructured data object;
   in response to identifying the first storage event:
   streaming, from a storage resource, first system metadata associated with the first unstructured data object;
   identifying, using a first system metadata processor, a first object type associated with the first unstructured data object based on the first system metadata;
   storing the first system metadata in a first entry of a first metadata table;
   prior to streaming second system metadata associated with a second unstructured data object:

making a first determination that the first object type is associated with advanced metadata processing;
in response to the determination:
streaming first data associated with the first unstructured data object;
extracting first advanced metadata using a first object type metadata processor;
storing the first advanced metadata in the first entry:
streaming the second system metadata associated with the second unstructured data object;
identifying, using the first system metadata processor, a second object type associated with the second unstructured data object based on the second system metadata; and
storing the second system metadata in a second entry of a second metadata table, wherein the second metadata is queried to obtain the first unstructured data object.

2. The method of claim 1, wherein the method further comprises:
making a second determination that the second object type is associated with advanced metadata processing;
in response to the second determination:
streaming second data associated with the second unstructured data object;
extracting second advanced metadata using a second object type metadata processor; and
storing the second advanced metadata in the second entry.

3. The method of claim 2, wherein the first advanced metadata comprises first metadata properties and the second advanced metadata comprises second metadata properties.

4. The method of claim 2, wherein the first object type metadata processor comprises a first data analytics model and the second object type metadata processor comprises a second data analytics model.

5. The method of claim 1, wherein the first metadata table and the second metadata table comprise a table format.

6. The method of claim 1, wherein the first metadata table comprises entries associated with the first object type and the second metadata table comprises entries associated with the second object type.

7. The method of claim 1, wherein the storage resource comprises one selected from a group consisting of:
cloud storage resources;
core storage resources; and
edge storage resources.

8. A system for managing metadata associated with unstructured data, comprising:
storage resources for storing unstructured data objects; and
a metadata manager, comprising a processor and memory, and programmed to:
identify a first storage event associated with a first unstructured data object;
in response to identifying the first storage event:
stream, from a storage resource, first system metadata associated with the first unstructured data object;
identify, using a first system metadata processor, a first object type associated with the first unstructured data object based on the first system metadata;
store the first system metadata in a first entry of a first metadata table;

prior to streaming second system metadata associated with a second unstructured data object:
make a first determination that the first object type is associated with advanced metadata processing;
in response to the determination:
stream first data associated with the first unstructured data object;
extract first advanced metadata using a first object type metadata processor;
store the first advanced metadata in the first entry;
stream the second system metadata associated with the second unstructured data object;
identify, using the first system metadata processor, a second object type associated with the second unstructured data object based on the second system metadata; and
store the second system metadata in a second entry of a second metadata table.

9. The system of claim 8, wherein the metadata manager is further programmed to:
make a second determination that the second object type is associated with advanced metadata processing;
in response to the second determination:
stream second data associated with the second unstructured data object;
extract second advanced metadata using a second object type metadata processor; and
store the second advanced metadata in the second entry.

10. The system of claim 9, wherein the first advanced metadata comprises first metadata properties and the second advanced metadata comprises second metadata properties.

11. The system of claim 8, wherein the metadata manager is further programmed to:
obtain a query request and a query planner and optimizer associated with the first metadata table;
in response to obtaining the query request and the query planner and optimizer;
identify a portion of the first metadata table based on the query planner and optimizer; and
service the query request using the portion of the first metadata table.

12. A non-transitory computer readable medium comprising computer readable program code, which when executed by a computer processor enables the computer processor to perform a method for managing metadata of unstructured data, the method comprising:
identifying a first storage event associated with a first unstructured data object;
in response to identifying the first storage event:
streaming, from a storage resource, first system metadata associated with the first unstructured data object;
identifying, using a first system metadata processor, a first object type associated with the first unstructured data object based on the first system metadata;
storing the first system metadata in a first entry of a first metadata table;
prior to streaming second system metadata associated with a second unstructured data object:
making a first determination that the first object type is associated with advanced metadata processing;
in response to the determination:
streaming first data associated with the first unstructured data object;

extracting first advanced metadata using a first object type metadata processor;

storing the first advanced metadata in the first entry;

streaming the second system metadata associated with the second unstructured data object;

identifying, using the first system metadata processor, a second object type associated with the second unstructured data object based on the second system metadata; and storing the second system metadata in a second entry of a second metadata table, wherein the second metadata is queried to obtain the first unstructured data object.

13. The non-transitory computer readable medium of claim 12, wherein the method further comprises:

making a second determination that the second object type is associated with advanced metadata processing;

in response to the second determination:

streaming second data associated with the second unstructured data object;

extracting second advanced metadata using a second object type metadata processor; and storing the second advanced metadata in the second entry.

14. The non-transitory computer readable medium of claim 13, wherein the first advanced metadata comprises first metadata properties and the second advanced metadata comprises second metadata properties.

15. The non-transitory computer readable medium of claim 13, wherein the first object type metadata processor comprises a first data analytics model and the second object type metadata processor comprises a second data analytics model.

16. The non-transitory computer readable medium of claim 12, wherein the first metadata table and the second metadata table comprise a table format.

17. The non-transitory computer readable medium of claim 12, wherein the first metadata table comprises entries associated with the first object type and the second metadata table comprises entries associated with the second object type.

* * * * *